July 19, 1932.  S. F. PARHAM  1,868,249
CONTINUOUS TWO-TABLE FORMING MACHINE
Filed Nov. 19, 1929   3 Sheets-Sheet 2
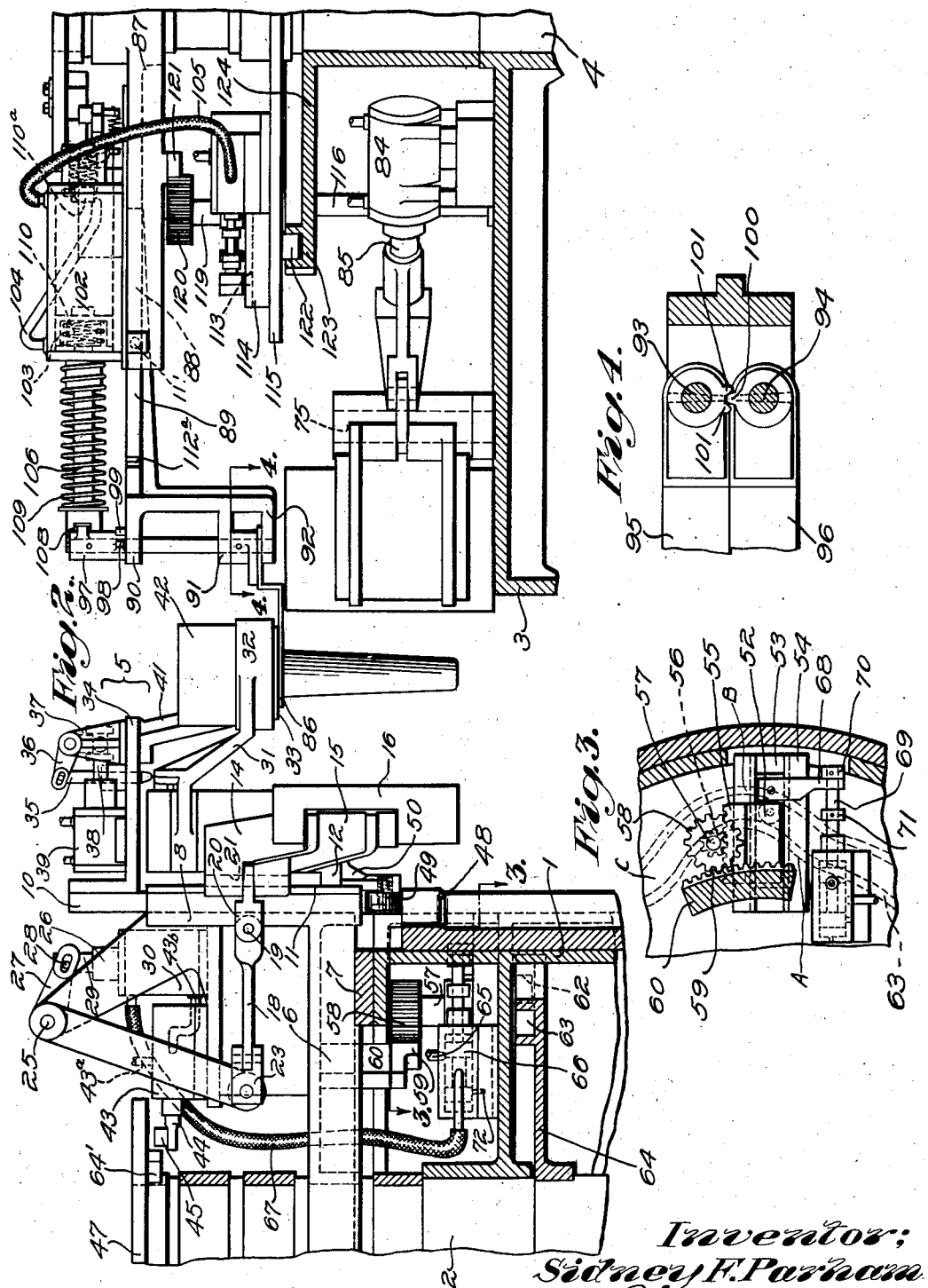
Inventor;
Sidney F. Parham
by Burns & Parham
Attorneys

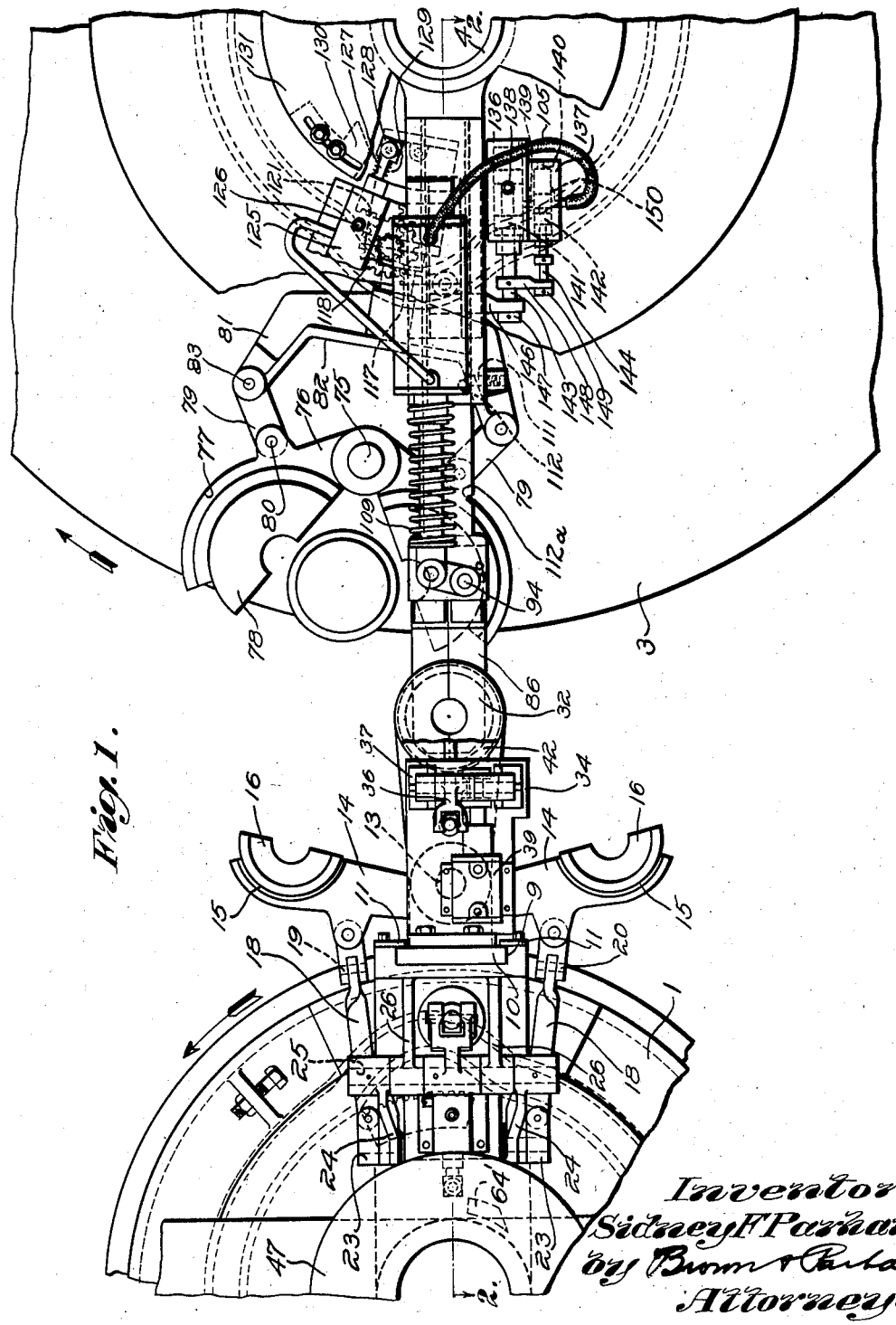

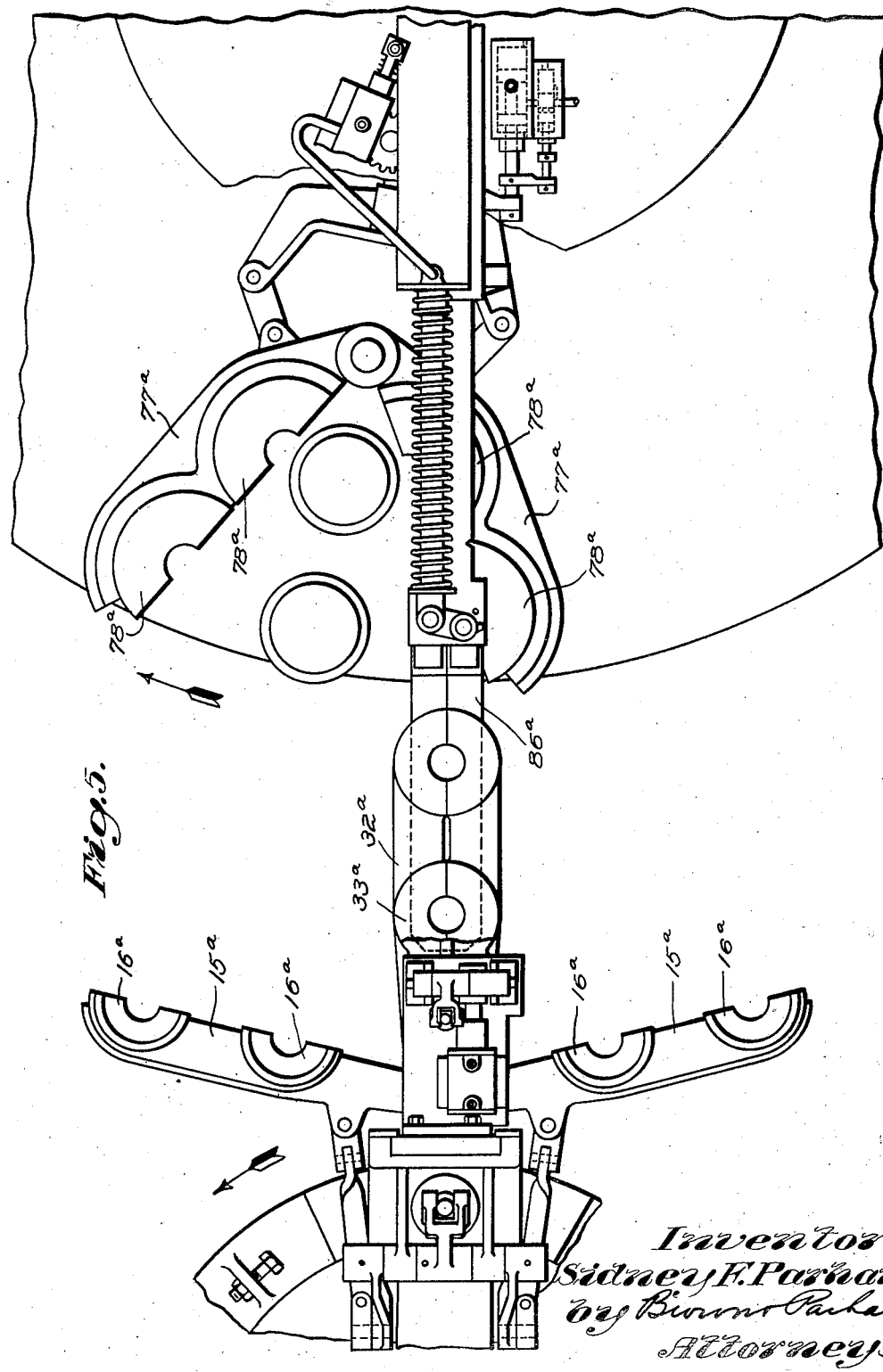

Patented July 19, 1932

1,868,249

UNITED STATES PATENT OFFICE

SIDNEY F. PARHAM, OF WEST HARTFORD, CONNECTICUT, ASSIGNOR TO HARTFORD-EMPIRE COMPANY, OF HARTFORD, CONNECTICUT, A CORPORATION OF DELAWARE

CONTINUOUS TWO-TABLE FORMING MACHINE

Application filed November 19, 1929. Serial No. 408,227.

This invention relates to continuous two-table forming machines and has particular relation to such machines wherein the glass for each article is given a preliminary shape in a parison mold mounted on one table, and then is transferred to a blow mold on the other table wherein the formation thereof is completed, the transfer operation being effected without interrupting the rotation of the parison and blow mold tables.

In my copending application, Serial No. 363,523, filed May 16, 1929, of which this application is a continuation in part, I have disclosed and claimed a novel machine and a novel method for transferring parisons from the parison mold units on one table to the blow molds on the other table while the tables are rotating. In the construction specifically illustrated in said application, the transfer of each parison is effected by means of a neck mold associated with the parison mold in the following manner. After a parison has been formed in the parison mold and associated neck mold, the parison mold is opened leaving the parison suspended from the neck mold, and the neck mold and parison are brought into alignment with the appropriate blow mold at a transfer point or zone. The movements of the neck mold and blow mold are retarded or stopped with respect to their tables to cause them to dwell at the transfer point or zone, thereby permitting the blow mold to be closed about the parison and the neck mold to be opened releasing the parison in the blow mold. After these operataions have been effected, the movements of the molds with their respective tables are resumed.

It is an object of this invention to provide a novel continuous two-table glassware forming machine which, while resembling the machine and employing the method disclosed in the aforesaid application, may be distinguished therefrom in that a pair of transfer tongs or the like is employed for transferring a parison from a parison mold on one table to the blow mold on the other table, the transfer tongs being caused to dwell or come to rest at the transfer point or zone, whereby they may be closed about the parison without injury to the parison.

It also is an object of this invention to provide a novel machine of the above character wherein both the parison forming unit and the transfer tongs are caused to dwell at the transfer point or zone to effect the transfer of a parison from the parison forming unit on one table to the blow mold on the other table.

Another object of this invention is to provide a novel continuous two-table glassware forming machine of the above character embodying transfer tongs mounted for rotation above the axis of the bow mold table, and having mechanism associated therewith for moving the tongs outwardly radially of the blow mold table into a position to close about a parison held suspended by a neck mold on the parison mold table, the tongs also being retarded in their rotation relative to the mold table at the transfer point or zone, during the transfer operation.

Other objects and advantages of the invention will be pointed out in the detailed description thereof which follows, or will become apparent from such description.

In order that the invention may readily be understood, reference should be had to the accompanying drawings in which two embodiments thereof are illusrtated;

In said drawings:

Figure 1 is a view in top plan of apparatus embodying the invention, showing fragmentary portions of a parison mold table and a blow mold table, and showing a pair of transfer tongs closed about a parison suspended from a neck mold;

Fig. 2 is a view partly in elevation and partly in longitudinal section, taken substantially on the line 2—2 of Fig. 1;

Fig. 3 is a view in horizontal section taken on the line 3—3 of Fig. 2;

Fig. 4 is an enlarged view of a portion of the tongs mechanism, taken on the line 4—4 of Fig. 2; and Fig. 5 is a view similar to Fig. 1, but showing a modification of the construction shown in Figs. 1 to 4, in which plural cavity or multiple parison molds, neck molds, and blow molds are provided, and in which a pair of multiple tongs operate to transfer two parisons at a time from the parison mold unit to the blow mold.

The apparatus illustrated herein embodying the present invention may be described briefly as follows:

A parison mold table and a blow mold table are mounted eccentrically of each other in adjoining relation and are continuously rotated in opposite directions in synchronism. The parison mold table carries a plurality of substantially identical parison forming units and the blow mold table carries a corresponding number of blow molds which also may be identical in construction. The axes of the mold tables are spaced apart at such a distance that the rotation of the tables moves the molds through adjacent circular paths which are spaced apart a substantial distance where they are closest, or in the transfer zone. Transfer tongs are mounted for movement about the column of the blow mold table, there being one pair of said tongs associated with each blow mold, normally positioned thereabove. Hence, only one parison forming unit and its associated or companion blow mold and only one pair of transfer tongs, and associated mechanisms, are illustrated in the drawings, and the invention will readily be understood from the following description thereof.

The parison forming unit is identical to that disclosed in my aforesaid copending application, that is to say, it comprises a neck mold and a parison mold mounted for vertical reciprocatory movement to permit the parison mold to dip into a pool of molten glass to gather a charge of glass for a parison by suction. The parison forming unit also is mounted for movement relative to the parison mold table and has mechanism associated therewith for causing the unit to dwell in its movement at the transfer point or zone, at which time the parison is left suspended from the neck mold by the opening of the parison mold to permit the tongs to close about the parison.

As the neck mold and the parison suspended therefrom and the blow mold approach each other in the transfer zone, the tongs transfer mechanism is projected radially of the blow mold table and the tongs are opened, while at the same time the rotation of the mechanism is retarded or stopped relative to the blow mold table to cause it to dwell in the transfer zone at the same time that the neck mold and suspended parisons are in the position of dwell. Thus, the neck mold and parison and the tongs occupy proper positions at this time to permit the tongs to close about the parison during the period of dwell, or while the movements of the neck mold and parison and the tongs are retarded. After the tongs are closed about the parison, the neck mold is opened and the rotation of the parison mold unit and of the transfer mechanism with their respective tables is resumed and accelerated. The tongs mechanism is moved inwardly of the blow mold table during the period in which the rotation thereof with the blow mold table is resumed and accelerated, as a result of which the parison is brought into vertical alignment with the blow mold, whereupon the blow mold is closed about the parison. Subsequently, the tongs are opened and a suitable blow head (not shown) is brought into engagement with the blow mold to blow the parison to final shape therein.

Referring in detail to the drawings:

The numeral 1 designates a parison mold table arranged to rotate about the axis of a column 2, and the numeral 3 indicates a blow mold table which is arranged to rotate about the axis of a column 4. These tables are continuously rotated in synchronism by suitable means (not shown) to cause each parison mold and its cooperating blow mold to reach the point of transfer or transfer zone simultaneously and at the proper time in the cycle of rotation of the machine.

The glass receiving and parison forming unit designated generally at 5 is mounted upon a radially extending carriage 6 rotatably mounted on the column 2, and provided with a bearing plate 7 which has sliding engagement with the top of the table 1. This arrangement of the carriage 6 permits the parison forming unit 5 and the table 1 to be moved horizontally relatively to each other in a manner and for a purpose to be described hereinafter.

The outer end portion of the carriage 6 comprises an upstanding supporting member 8, having an outwardly facing channel 9 (Fig. 1) formed therein which constitutes a vertical guide-way for a vertically slidable plate 10 which is held in the said guide-way by retainer strips 11. The slide plate 10 carries a bracket 12 near its lower end on which is mounted a vertical pivot element 13 (Fig. 1) on which the arms 14 of the holders 15 for the half-sections 16 of the parison body mold, are pivotally mounted.

Mechanism is provided for opening and closing the body mold at appropriate times. This mechanism comprises links 18, each of which is pivotally connected at its outer end by a transverse pivot member 19 to a clevis 20. Each clevis, in turn, is pivotally connected to one of the arms 14 of holders 15 by a vertical shaft or pivot element 21 which extends through spaced lugs formed on said arm, as shown. The clevises 20 constitute universal joints between the outer ends of the links 18 and their respective arms 14. The inner ends of the links 18 are connected by similar clevises 23 to the downwardly extending crank arms 24 which are mounted on and secured to the outer ends of a transverse shaft 25 suitably journaled in brackets 26 provided on the carriage 6. Rigidly secured to the middle of shaft 25 is a bifurcated arm 27, the adjoining ends of which are slotted as shown in Fig. 2, and are connected by a pin 28 extending through the slots to an upstanding rod 29 of a piston contained in a cylinder 30. This cylinder is supported by the carriage 6, and is located between the brackets 26. It will be observed that the admission of fluid pressure to and the exhaust from, opposite ends of the cylinder 30 alternately will cause reciprocation of the piston in the said cylinder which will result in the opening and closing of the body mold. It also will be seen that the opening and closing of the mold may be accomplished irrespective of its vertical position because of the universal linkage between arms 24 and the mold supports.

Mounted on the upstanding pivot element 13, previously referred to, are the arms 31 of the holders 32 for the sections 33 of the neck ring, or mold. The neck ring, or mold, is opened and closed by mechanism carried by an outwardly extending bracket 34, provided on plate member 10. This mechanism comprises a pin 35, the lower end of which is tapered for enabling the said pin to cooperate with lugs on the arm 31 to part the sections of the neck mold by a wedging action. The neck mold may be held closed by a spring (not shown) in known manner. The pin 35 is pivotally connected at its upper end to a bell-crank lever 36, pivotally supported in a bracket 37, and connected to the rod 38 of a piston contained in a cylinder 39 carried by the bracket 34. Suitable means (not shown) is provided for controlling the supply and exhaust of fluid pressure to and from the opposite end of the cylinder 39 to open and close the neck ring at appropriate times.

Connected to the outer end of the bracket 34 is a downwardly extending arm 41 which carries a head 42 which has fluid-tight engagement with the neck mold and body mold when the said molds are closed. Suction may be applied through this head to the body and neck molds when the parison forming unit is moved into position to gather a charge of glass from a pool; and if desired, pressure also may be supplied through the head 42 to assist in the shaping of the parison.

In each cycle of rotation of the parison mold table, the glass receiving and parison forming unit will be dipped into a suitable gathering pool (not shown). Prior to the time that the unit reaches a position over the gathering pool, the neck mold will be closed by the operation of the piston and cylinder 39, to raise the pin 35. The parison body mold also will be closed at this time by the admission of fluid pressure into the space in the lower end of the cylinder 30 and the exhaust of fluid pressure from the space in the upper end of said cylinder. Supply and exhaust of fluid pressure to the bottom of cylinder 30 is controlled by means of a two-way slide valve 43 carried by the carriage 6, as shown. Fluid pressure from a suitable source (not shown) may be conducted through a conduit 43a to the valve 43 and thence through a conduit 43b to the space in the lower end of the cylinder 30. Communication between the conduits 43a and 43b is controlled by a slide valve member, the stem 44 of which projects from the inner end of the valve 43, and carries a cam roller 45 adapted to cooperate with a cam (not shown) supported on the underside of a plate 47 carried by the column 2. As the table 1 rotates to carry the parison forming unit toward the gathering pool, the cam 46 acts on cam roller 45 to move the slide valve member to the left, looking at Fig. 1. Fluid pressure is thereupon admitted to the lower end of cylinder 30 and the parison body mold closed.

The dipping of the mold unit into the glass of the gathering pool and the adjustment of the said unit to different levels is accomplished by causing the said unit to reciprocate vertically in the guideway 9 formed in the upstanding portion 8 of the carriage 6. Such reciprocation of the unit is effected by means of a stationary cam 48 of suitable contour which surrounds the periphery of the table 1. This cam is engaged by a cam roller 49 carried by an inwardly projecting stud mounted in a downwardly extending bracket 50, formed on the lower portion of the vertically slidable plate 10 (Fig. 2). As the table 1 is rotated, the cam roller rides upon the cam and causes the glass receiving and parison forming unit to be raised and lowered at appropriate times to the desired level, or levels.

After a charge of glass has been gathered by the parison forming unit, the rotation of the table 1 carries the said unit toward the transfer point or zone. As previously stated, the machine embodies mechanism for causing the unit to be retarded in its rotation about the axis of the column 2 and to dwell at the transfer point to permit the parison or blank to be transferred to the blow mold. Said mechanism comprises a slide 52 (Fig. 3) mounted in a radially extending guideway 53 formed in a plate 54 secured to the table 1. Formed on one edge of the slide 52 is a rack 55 which meshes with and operates a pinion 56 secured to a vertically extending shaft 57 suitably journaled in bearings provided on the table 1. At its upper end, the shaft 57 carries a spur gear 58 which meshes with a sector gear 59 secured to a downwardly extending portion 60 of the carriage 6. Secured to the bottom side of the slide 52 is a cam roller 62 which operates in a cam path 63 formed on a stationary plate 64 carried by the column 2.

Referring to Fig. 3 it will be observed that the cam path 63 deviates from a circle radially and outwardly of the table 1. The point A in the cam path marks the beginning of the outward bend of the said cam path, and the travel of the cam roller 62 along such outward bend causes the slide 52 to be moved radially and outwardly of the table. As a result, the pinion 55, shaft 57 and gear 58 are rotated counterclockwise. The rotation of gear 58, by its engagement with the sector gear 59, causes the carriage 6 and the parison forming unit mounted thereof to be rotated horizontally relatively to the table 1 and in an opposite direction to the rotation of the said table. As the cam roller 62 is moved toward the point B of the cam path which indicates the outermost part of the cam path, the retarding movement of the carriage and the unit is accelerated and the shape of the cam path is such as to cause a dwell, or a brief period of rest, of the carriage and the parison forming unit. During this dwell or period of rest, the parison or blank may be transferred to the blow mold as will be pointed out hereinafter. As the cam roller 52 passes the point B, it is caused to move inwardly of the table by an inward bend of the cam path, until the point C in the cam path is reached. At this point, the circular movement of the cam roller is resumed. As a result of this inward movement of the cam roller, the pinion 56, shaft 57, and gear 58 are rotated in a clockwise direction thereby causing the rotation of the carriage 6 and the parison forming unit in the direction of rotation of the table 1 to be resumed and accelerated until the cam roller reaches the point C after which the carriage 6 travels with the table and at the same speed.

Just prior to the time that the parison forming unit reaches the transfer point, fluid pressure may be exhausted from the space in the lower end of cylinder 30 and admitted to the space in the upper end of said cylinder to open the parison body mold 16. The exhaust of fluid pressure from the lower end of the cylinder is effected by the movement of the slide valve member outwardly of the table. This movement is brought about by the engagement of roller 45 on the valve stem 44 with a cam 64' carried by plate 47, as shown. The means for controlling the admission of fluid pressure to the upper end of cylinder 30 is as follows: Fluid pressure is conducted from a suitable source to a conduit 65 connected to a two-way valve 66, to an outlet port of which valve is connected a flexible conduit 67, which leads to the space in the upper part of the cylinder 30. The flow of fluid pressure through the conduit 67 is permitted by the outward movement of a slidable valve member in the valve 66, such movement being effected by means of an arm 68 carried by the slide 52. This arm slidably engages the stem 69 of the valve member and outward movement of said arm causes it to engage a collar 70 fixed to the outer end of stem 69. Therefore it will be seen that when the slide 52 moves radially and outwardly of the table 1 to retard the movement of the parison forming unit, it also will serve through its outward movement of arm 68, to open the valve 66 which permits the flow of fluid pressure to the upper end of the cylinder 30 to open the parison body mold 16. When the slide 52 moves inwardly, as previously described, the arm 68 will be moved into engagement with a collar 71 on the valve stem 69 to move the valve inwardly, closing off the communication between conduits 65 and 67, and establishing communication between the conduit 67 and an exhaust port 72 formed in the valve 66. This permits fluid pressure in the upper space of the cylinder 30 to be exhausted to atmosphere to permit the piston in the cylinder 30 to be subsequently moved upwardly by the admission of fluid pressure to the lower space in the cylinder 30 to close the body mold as previously described. It now will be seen that the valve mechanism which is provided causes the opening and closing of the parison body mold in timed relation respectively to the approach thereof toward transfer and gathering position.

The blow mold and the operating mechanism therefor are similar to that shown in my prior application, except that the blow mold is mounted directly on the table and does not rotate with respect thereto. Mounted on the blow mold table 3 is an upstanding pivot member 75 upon which the arms 76 of holders 77 for the blow mold sections 78, are rotatably mounted. Links 79 are pivotally connected at their outer ends, as indicated at 80, to lugs formed on the arms 76. The inner ends of these links are connected to the arms 81 of a cross head 82, by pivot members indicated at 83.

Reciprocation of the cross head 82 causes the blow mold to be opened and closed. Such reciprocation is effected by means of a piston in a cylinder 84, the rod 85 of which is connected to the cross head, as shown. The cylinder 84 is provided with air conduits on its opposite ends through which air pressure is alternately admitted and exhausted at appropriate times by suitable valve mechanism, not shown.

We now come to consider the transfer mechanism. This mechanism includes a pair of tongs indicated generally at 86. The tongs 86 are supported and operated by the following mechanism: Mounted for oscillation on the column 4 of the blow mold table is a supprt 87. The support 87 normally is positioned above the blow mold and has a slideway 88 formed therein in which a carriage 89 is mounted for reciprocation radially of the column 4. Formed on the outer end of the carriage 89 are outwardly extending, vertically spaced brackets 90, 91 and 92. Suitably journaled in the brackets 90, 91 and 92 is a pair of vertical shafts 93 and 94, Figs. 2 and 4. Mounted on the bottom end of shafts 93 and 94 and rigidly secured thereto are the grippers or tongs members 95 and 96 of the tongs 86. Secured to the upper end of shaft 94 above the bracket 90, is a crank arm 97 to which suitable mechanism, to be hereinafter described, is connected for rotating shaft 94 to open and close the tongs. The extent of opening of the tongs is limited by a lug 98 formed on the hub of crank arm 97, which lug strikes a similar lug 99 formed on the top of the bracket 90 when the shaft 94 is rotated to open the tongs. These lugs also provide an operative connection between the tongs operating means and carriage 89, as will appear hereinafter.

Motion is transmitted from shaft 94 to shaft 93 by means of a gear tooth 100 formed on the hub of gripper 96, which gear tooth meshes with a pair of teeth 101 formed on the hub of gripper 95. By means of this construction, when shaft 94 is rotated in one direction, shaft 93 will be rotated in the other direction to open or to close the tongs.

As previously stated, the tongs transfer mechanism is moved outwardly and inwardly of the blow mold table during a transfer operation. The means for effecting such movements of the tongs mechanism also serves to open or close the tongs at the required times. Mounted on the support 87 is a cylinder 102 in which a piston 103 reciprocates. Air pressure is alternately admitted and exhausted from the opposite ends of cylinder 102 through conduits 104 and 105 by means of valve mechanism which will be referred to later. The rod 106 of piston 103 is connected at its outer end to crank arm 97, by means of a clevis 108. A tension spring 109 is interposed between the clevis 108 and the outer end of cylinder 102 and yieldingly urges the tongs to open position. When air pressure is exhausted from the outer end of cylinder 102, and is admitted to the inner end thereof, piston 103 moves outwardly, first opening the tongs until lug 98 strikes lug 99, thereby providing an operative connection between the piston and the carriage 89, and second, moving the carriage 89 outwardly of the blow mold table in the slideway 88 until the piston reaches the end of its stroke. This serves to move the tongs outwardly of the blow mold table to the required extent to permit the previously opened tongs to close about a parison suspended from the neck mold. The tongs are closed at this time by means of a slight inward movement of piston 103. Such movement of the piston is effected by means of a compression spring 110 provided in the piston 103. When the piston 103 reaches the end of its outward stroke, spring 110 is compressed so that by subsequently exhausting air from the inner end of the cylinder 102, the spring 110 can expand sufficiently to close the tongs. Inward radial movement of the carriage 89 is prevented at this time by means of a spring pressed detent 111 mounted in the support 88 and adapted to engage a notch 112 formed on the edge of the carriage 89.

The tongs transfer mechanism is moved inwardly of the blow mold table by the exhaust of pressure from the inner end of cylinder 102 and the admission of pressure into the outer end thereof. Such pressure overcomes the resistance of detent 111. In order to open the tongs when in inwardly retracted position, a spring buffer 110a is provided in the inner end of cylinder 102. This buffer is compressed by piston 103 in its inward stroke, and at the appropriate time, pressure is exhausted from the outer end of cylinder 102, whereupon the piston is moved outwardly by the buffer a sufficient distance to open the tongs. Outward movement of the carriage 89 at this time is prevented by the engagement of detent 111 with a notch 112a on said carriage.

The retard and resume mechanism for the tongs resembles that for the parison mold unit and comprises a slide 113 mounted in a slideway provided in a plate 114, secured to a support 115. The support 115 is mounted for rotation about the column 4 with the blow mold table and is fixed to said table and supported above the same by means of posts, one of which is shown at 116. The slide 114 has a rack 117 formed thereon with which rack a pinion 118 is in mesh. The pinion 118 is secured to a vertical shaft 119 upon the upper end of which a spur gear 120 is mounted. The spur gear 120 in turn meshes with a sector gear 121 secured to the bottom of the support 87.

Mounted on the under side of the slide 113 is a cam roller 122 which engages a cam path 123 formed in a stationary plate 124 secured to the column 4 of the machine. The contour of the cam path 123 is similar to that of the cam path 63 for controlling the retard and resume movements of the parison mold unit on the parison mold table. Consequently, the movement of cam roller 122 along the cam path 123 will cause the movement of rotation of the tongs transfer mechanism to be retarded or stopped during the transfer period, by the rotation of the support 88, effected by the mechanism just described, in a direction opposite to the direction of rotation of the blow mold table. After the tongs have closed about a parison, the movement of the cam roller 122 in the cam path 123 will cause the rotation of the transfer mechanism in the direction of rotation of the blow mold table to be resumed and accelerated until the transfer mechanism resumes its travel with the blow mold in vertical alignment therewith.

Considering now the valve mechanism for controlling the admission and exhaust of fluid pressure to and from the opposite ends of cylinder 102, a two-way slide valve 125, similar to valve 43, previously referred to, controls the passage of fluid pressure through conduit 104, which conduit is connected to the valve as shown. Fluid pressure from a suitable source is conducted to the valve 125 through a conduit 126, thence through the valve and conduit 104 to the space in the outer end of cylinder 102. Communication between these two conduits is controlled by a slidable valve member, the stem 127 of which projects inwardly from the valve casing and carries a cam roller 128 on its inner end. A suitable exhaust port, not shown, is provided in valve 125, which port permits the exhaust of fluid pressure from the outer end of the cylinder through conduit 104 when the valve member is in its inwardly retracted position. Said valve member is held in such position by means of a tension spring 129, one end of which is connected to the arcuate gear 121 and the other end of which is connected to the outer end of the valve stem 127. The valve member is moved outwardly of the valve casing, to permit the flow of fluid pressure from conduit 126 into conduit 104 and thence to the space in the outer end of the cylinder 102, by the engagement of cam roller 128 with a stationary cam 130 adjustably mounted on a plate 131 carried by the column 4 of the blow mold table. The location of cam 130 is such that as the transfer mechanism begins to resume its travel with the blow mold table and the blow mold, cam roller 128 strikes cam 130, as a result of which fluid pressure is admitted to the outer end of the cylinder 102 to move the transfer mechanism inwardly radially of the blow mold table. Such inward movement is permitted by the previous exhaust of fluid pressure from the inner end of the cylinder 102 through conduit 105, as will hereinafter appear.

The exhaust of pressure from the outer end of the cylinder 102 is effected by the disengagement of cam roller 128 with the cam 130, which results from the rotation of the tongs transfer mechanism about the column 4 of the machine. This permits spring 129 to move the valve member to exhaust position, where it is held until roller 128 again strikes cam 130.

The control of the passage of fluid pressure to and from the inner end of cylinder 102 through conduit 105 is controlled by the following mechanism: Mounted on the support 115 is a pair of valves 136 and 137. Fluid pressure is conducted to valve 136 through a conduit 138 and thence into valve 137 through a port 139 which connects the valve chambers in the two valves as shown in Fig. 1. Valve 137 is provided with an exhaust port 140 through which fluid pressure from the inner end of cylinder 102 is permitted to exhaust to the atmosphere. Valves 136 and 137 contain piston valve members 141 and 142 having stems 143 and 144 extending outwardly therefrom.

The valve members 141 and 142 are reciprocated by means of an arm 146 carried by the slide 113. The arm 146 engages the valve stem 143 between a collar 147 on the outer end of said stem and a cross head 148 mounted inwardly of the collar. The cross head 148 in turn engages the valve stem 144 between a pair of spaced collars 149 provided on said valve stem. Thus, lost motion connections are provided between the arm 146 and the valve stem 143 and between the valve stem 143 and valve stem 144.

As the cam roller 122 rides outwardly in the outwardly extending portion of cam 123, slide 113 is moved outwardly effecting the following operations: First, valve member 141 is moved outwardly to admit fluid pressure into port 139. Then the valve member 142 also is moved outwardly to permit fluid pressure from port 139 to flow into and through conduit 105 and thence into cylinder 102 to project the transfer mechanism outwardly of the blow mold table. During further outward movement of slide 113, valve member 142 is moved into a position to close port 139 and to uncover a groove 150 in the valve 137 which establishes communication between conduit 105 and exhaust port 140, thereby exhausting fluid pressure from the inner end of cylinder 102 preparatory to the inward movement of the transfer mechanism.

As the cam roller 122 rides along the inwardly bending portion of cam 123, slide 113 is moved inwardly effecting the following operations: First, the valve member 141 is moved into a position to cover the port 139, whereupon valve member 142 is moved to its innermost closed position, during the course of which movement communication is established between port 139 and conduit 105. However, the flow of fluid pressure from conduit 138 through valve 136 and port 139 is prevented at this time by valve member 142 so that as the valve members are moved inwardly, fluid pressure will not be admitted to the inner end of cylinder 102. Thus, valve member 142 is rendered inoperative to admit fluid pressure into the inner end of cylinder 102 which otherwise would oppose the inward movement of piston 103, effected by valve 125, as previously described.

The construction shown in Fig. 5 is substantially the same as that shown in the other figures, except as follows: Each of the neck mold holders 32a carries the sections 33a of a pair of neck molds, and each of the parison mold holders 15a carries a pair of sections 16a of a pair of blow molds. In like manner, the blow mold holders 77a carry pairs of sections 78a of a pair of blow molds. The tongs 86a are arranged to grip a pair of parisons suspended from the neck molds 33a and the actuating mechanism therefor is arranged to project the tongs radially of the blow mold table a sufficient distance to enable the tongs 86a to grip the two parisons suspended from the neck mold. In all other respects, the construction of the apparatus illustrated in Fig. 5 is identical to that disclosed in the other figures.

The operation of the apparatus shown in Figs. 1 to 4 and described above is as follows:

The parison forming unit and the blow mold are continuously rotated in spaced circular paths. When a charge of glass for a parison has been gathered by suction in the parison mold and associated neck mold, the parison forming unit moves toward the transfer point or zone at the same time that the blow mold and the associated tongs approach said point or zone. During such movements, the parison mold is opened, leaving the parison suspended from the neck mold. The blow mold will previously have been opened to permit a previously completed article to be removed therefrom.

As the parison forming unit and the transfer tongs approach each other, the rotation thereof is retarded and the transfer tongs are projected radially of the blow mold table by the admission of air to the inner end of cylinder 102 through valves 136 and 137, so that by the time that the neck mold and the tongs mechanism come into line, or reach the positions shown approximately in Fig. 1, the neck mold and parison and the tongs will be stationary, or at least moving slowly. At this time, the tongs will be closed about the parison by the expansion of spring 110, which is permitted by the movement of valve member 142 in valve 137 to exhaust position, as previously described, after which the neck mold is opened, releasing the parison in the tongs. The movement of the parison forming unit, and of the transfer tongs with the parison therein, with their respective tables will now be resumed at accelerated rates and during such movement of the transfer mechanism, valve 125 will be operated to admit fluid pressure into the outer end of cylinder 102, as a result of which the transfer tongs and parison are moved inwardly of the blow mold table into vertical alignment with the blow mold. The blow mold now is closed about the suspended parison and the valve 125 is moved to exhaust position to permit the previously compressed spring buffer 110a to force piston 103 outwardly a slight distance to open the tongs, releasing the parison in the blow mold.

The operation of the construction shown in Fig. 5 is substantially the same as that of Figs. 1 to 4 and hence need not be described.

Various changes in the details of construction of my novel apparatus may be made without departing from the scope of the appended claims. For example, instead of holding the parison by the neck mold in effecting the transfer operation, it may be held in the parison mold as disclosed in the co-pending application of Algy J. Smith, Ser. No. 400,519, filed Oct. 18, 1929. While I have illustrated my invention as applied to a machine in which the parison molds and associated neck molds are charged by suction, it is to be distinctly understood that the said invention may equally well be applied to a machine in which the said molds are charged by suspended charge feeding, or otherwise, and that the invention is not limited to use in a suction gathering forming machine.

Having thus described my invention, what I desire to claim and to secure by Letters Patent is:

1. A glassware forming machine comprising two adjacent continuously rotating mold tables positioned laterally of each other, a blank mold unit on one table and including a neck mold and blank mold, a blow mold on the other table, means for causing said molds normally to rotate with their respective tables, and means for transferring a blank from the blank mold unit to the blow mold comprising means for rotating at least one of the molds on one of the tables in a direction opposite to the direction of rotation of its table to retard the rotation of said mold relative to its table in a transfer zone, a ware holder on the other table, means for normally rotating said ware holder with its table, means for rotating said ware holder in a direction opposite to that of its table, to retard the rotation of the ware holder relative to its table in the transfer zone simultaneously with the retardation of the mold on the other table, means for effecting the transfer of a blank between the retarded mold and retarded ware holder while the tables continue to rotate, and means for causing the normal rotation of the retarded mold and ware holder with their respective tables to be resumed.

2. A glassware forming machine comprising two adjacent continuously rotating mold tables positioned laterally of each other, a blank mold unit on one table including a neck mold and a blank mold, a blow mold on the other table, means for causing said molds normally to rotate with their respective tables, and means for transferring a blank from the blank mold unit to the blow mold comprising means for rotating the neck mold in a direction opposite to that in which the blank mold table rotates to retard the rotation of the neck mold relative to said table in a transfer zone, a ware holder, means for normally rotating the ware holder with the blow mold table, means for rotating the ware holder in a direction opposite to that in which said table rotates to retard the rotation of the holder relative to the blow mold table in the transfer zone simultaneously with the retardation of the neck mold, means for effecting the transfer of a blank from the retarded neck mold to the retarded ware holder while the tables continue to rotate, and means for thereafter causing the normal rotation of the neck mold and ware holder with their respective tables to be resumed.

3. A glassware forming machine comprising two adjacent continuously rotating mold tables positioned laterally of each other, a blank mold unit on one table including a neck mold and blank mold, a blow mold on the other table, means for causing said molds normally to rotate with their respective tables, and means for transferring a blank from the blank mold unit to the blow mold comprising means for opening the blank mold to leave a blank suspended from the neck mold, means for rotating the neck mold and blank in a direction opposite to the direction of rotation of the blank mold table to retard the rotation thereof relative to said table in a transfer zone, transfer tongs, means for causing said tongs normally to rotate with the blow mold table, means for rotating said tongs in a direction opposite to that in which the table rotates to retard the rotation of the tongs relative to its table in the transfer zone simultaneously with the retardation of the neck mold and blank, means for closing the tongs about the blank during the retardation of the neck mold and tongs and for opening the neck mold to release the blank to the tongs, means for causing the normal rotation of the neck mold and the tongs with their respective tables to be resumed, means for closing the blow mold about the blank when the normal rotation of the tongs has been resumed, and means for opening the tongs to release the blank to the blow mold.

4. A glassware forming machine according to claim 1 comprising means in addition to the means for retarding the rotation of the ware holder relative to its table for horizontally moving the ware holder outwardly and inwardly of its table toward and away from a mold on the other table in the transfer zone.

5. A glassware forming machine according to claim 1 comprising means for reciprocating the ware holder outwardly and inwardly radially of its table toward and away from a mold on the other table in the transfer zone.

6. A glassware forming machine according to claim 2 comprising means in addition to the means for retarding the rotation of the ware holder for moving the ware holder outwardly and inwardly of the blow mold table toward and away from the neck mold in the transfer zone.

7. A glassware forming machine according to claim 3 comprising means in addition to the means for retarding the rotation of the tongs, for moving the tongs outwardly of the blow mold table into a position to be closed about a blank in the transfer zone and inwardly of said table to position the blank for enclosure by the blow mold.

8. A glassware forming machine according to claim 3 comprising means for radially reciprocating the tongs outwardly of the blow mold table into a position to be closed about a blank in the transfer zone, and inwardly of said table to position the blank for enclosure by the blow mold.

9. A glassware forming machine according to claim 1 wherein the blank mold, neck mold, and blow mold each has a plurality of mold cavities formed therein, said ware holder having a plurality of ware engaging openings for the simultaneous transfer of a plurality of blanks thereby.

10. A glassware forming machine according to claim 2 wherein the blank mold, neck mold, and blow mold each has a plurality of mold cavities therein, said ware holder having a plurality of ware engaging openings for the simultaneous transfer of a plurality of blanks thereby.

11. A glassware forming machine according to claim 1 wherein the blank mold, neck mold and blow mold each has a plurality of mold cavities formed therein, said ware holder having a plurality of ware engaging openings for the simultaneous transfer of a plurality of blanks thereby, and means in addition to the means for retarding the rotation of the ware holder for moving the holder outwardly and inwardly of its table in the transfer zone.

12. A glassware forming machine according to claim 2 wherein the blank mold, neck mold, and blow mold each has a plurality of mold cavities formed therein, said ware holder being provided with a plurality of ware engaging openings for the simultaneous transfer of a plurality of blanks, and means for radially reciprocating the ware holder outwardly and inwardly of the blow mold table in the transfer zone.

13. A glassware forming machine according to claim 3 wherein the blank mold, neck mold, and blow mold each has a plurality of mold cavities formed therein, and said tongs are provided with a corresponding number of ware receiving openings for the simultaneous transfer of a plurality of blanks.

14. A glassware forming machine according to claim 3 wherein the blank mold, neck mold, and blow mold each has a plurality of mold cavities formed therein, said tongs being provided with a corresponding number of ware receiving openings for the simultaneous transfer of a plurality of blanks, and means for moving said tongs outwardly and inwardly of the blow mold table in the transfer zone.

15. A glassware forming machine according to claim 3 wherein the molds each have a plurality of mold cavities therein, said tongs being provided with a corresponding number of ware receiving openings for the simultaneous transfer of a plurality of blanks, and means for radially reciprocating the tongs outwardly and inwardly of the blow mold table.

16. A glassware forming machine comprising two adjacent continuously rotating mold tables positioned laterally of each other, a blank mold unit on one of said tables and including a neck mold and a blank mold, a blow mold on the other table, means for causing said molds normally to rotate with their respective tables, and means for transferring a blank from the blank mold unit to the blow mold comprising means for rotating one of said molds in a direction opposite to that in which its table rotates and at the same angular speed as the table rotates to cause a dwell in the rotation of said mold in a transfer zone, a ware holder, means for causing the ware holder normally to rotate with the other of said tables, means for rotating said holder in a direction opposite to that in which its table rotates and at the same angular speed as the table rotates to cause a dwell in the rotation of the holder in the transfer zone simultaneously with the dwell of the last-named mold, means for effecting the transfer of a blank between the ware holder and mold while they are in dwell positions and the tables continue to rotate, and means for causing the normal rotation of the ware holder and mold to be resumed with their respective tables.

17. A glassware forming machine according to claim 16 comprising means in addition to the means for causing a dwell in the rotation of the ware holder for moving the ware holder inwardly and outwardly of its table in the transfer zone.

18. A glassware forming machine according to claim 16 in which each of the molds has a plurality of mold cavities therein, and the ware holder is provided with a plurality of ware receiving openings.

19. A glassware forming machine according to claim 16 wherein each of the molds has a plurality of mold cavities formed therein, the ware holder being provided with a plurality of ware receiving openings, and means for moving the ware holder inwardly and outwardly of its table in the transfer zone.

Signed at Hartford, Conn., this 12th day of November, 1929.

SIDNEY F. PARHAM.